US005543453A

United States Patent [19]

Ito et al.

[11] Patent Number: 5,543,453

[45] Date of Patent: Aug. 6, 1996

[54] COMPOSITION FOR FIXING WATER-COLOR INK, COVER FILM FOR THERMAL TRANSFER IMAGE USING COMPOSITION FOR FIXING WATER-COLOR INK, AND THERMAL TRANSFER IMAGE RECORDED MEDIUM

[75] Inventors: Kengo Ito; Motohiro Mizumachi; Yoshio Fujiwara; Satoru Shinohara, all of Miyagi, Japan

[73] Assignee: Sony Corporation, Tokyo, Japan

[21] Appl. No.: 469,674

[22] Filed: Jun. 6, 1995

Related U.S. Application Data

[62] Division of Ser. No. 290,718, Aug. 12, 1994, Pat. No. 5,462,910.

[30] Foreign Application Priority Data

| | | | |
|---|---|---|---|
| Dec. 14, 1992 | [JP] | Japan | 4-333027 |
| Apr. 27, 1993 | [JP] | Japan | 5-125445 |

[51] Int. Cl.$^6$ .......... C08K 3/34; C04B 14/04; G03G 11/00

[52] U.S. Cl. .......... 524/445; 524/449; 106/416; 106/417; 106/487; 430/104; 430/117

[58] Field of Search .......... 524/445, 449; 521/28; 430/117, 124; 106/416, 417, 487; 428/195

[56] References Cited

U.S. PATENT DOCUMENTS

| | | | |
|---|---|---|---|
| 4,211,437 | 7/1980 | Myers et al. | 428/914 |
| 4,446,174 | 5/1984 | Maekawa et al. | 428/206 |
| 4,613,525 | 9/1986 | Miyamoto, et al. | 427/256 |
| 4,738,555 | 4/1988 | Nagashima | 400/240 |
| 4,887,097 | 12/1989 | Akiya et al. | 162/135 |
| 5,061,744 | 10/1991 | Ogitani et al. | 524/445 |
| 5,137,568 | 8/1992 | Durham et al. | 106/487 |
| 5,160,371 | 11/1992 | Ito | 106/487 |
| 5,169,441 | 12/1992 | Lauzon | 106/487 |
| 5,248,720 | 9/1993 | Deguchi et al. | 524/445 |
| 5,322,756 | 6/1994 | Ziolo | 430/126 |
| 5,324,705 | 6/1994 | Ito | 428/195 |

FOREIGN PATENT DOCUMENTS

| | | |
|---|---|---|
| 0390928 | 10/1990 | European Pat. Off. . |
| 0506034 | 9/1992 | European Pat. Off. . |
| 3-243391 | 10/1991 | Japan . |
| 4-299183 | 10/1992 | Japan . |
| 2213078 | 8/1989 | United Kingdom . |

OTHER PUBLICATIONS

Patent Abstracts of Japan, vol. 007, No. 269 (M-259), Nov. 30, 1983 J-A-58 148778 (Sony KK) Sep. 3, 1983.

*Primary Examiner*—Tae Yoon
*Attorney, Agent, or Firm*—Hill, Steadman & Simpson

[57] ABSTRACT

A composition for fixing water-color ink for fixing a water-color ink is disclosed. The composition for fixing a water-color ink contains an ion exchanger, such as, a clay based interlayer compound or an ion-exchange resin. The composition for fixing water-color ink contains a water absorptive resin or a heat-melting resin as a binder. A cover film for thermal transfer is formed by forming a water-color ink fixing layer consisting of the composition for fixing water-color ink peelably on a base material. An adhesive layer or a heat-melting resin layer is formed on the water-color ink fixing layer. The cover film for thermal transfer image is superposed and thermo-compression bonded onto a thermal transfer image or a thermal transfer image having a protective layer, with the water-color ink fixing layer, the adhesive layer or the heat-melting resin layer facing the thermal transfer image or the thermal transfer image having the protective layer. The water-color ink fixing layer is transferred and stacked onto the cover film for thermal transfer image.

8 Claims, 2 Drawing Sheets

COMPOSITION FOR FIXING WATER-COLOR INK, COVER FILM FOR THERMAL TRANSFER IMAGE USING COMPOSITION FOR FIXING WATER-COLOR INK, AND THERMAL TRANSFER IMAGE RECORDED MEDIUM

This is a division of application Ser. No. 08/290,718, filed Aug. 12, 1994 now U.S. Pat. No. 5,462,910.

TECHNICAL FIELD

This invention relates to a composition for fixing water-color ink for forming a protective coat of a thermal transfer image, particularly a sublimation heat transfer image. This invention also relates to a cover film for thermal transfer image using the composition for fixing water-color ink and a thermal transfer image recorded medium.

BACKGROUND ART

Recently, a so-called "instant video portrait system" has been known, which is a system utilizing a sublimation transfer recording technique. This system operates by imaging an object with a video camera, then thermally transferring the video picture information as a static image onto a dye receptor layer of printing paper with the sublimation transfer recording technique, and using the resulting transfer image for various certificates. Thus, this system has been noted as a substitute of the conventional silver salt photography. For instance, this "instant video portrait system" has been adapted in Europe for specifying users of a ski pass or a railroad pass.

Such a thermal transfer image formed on the printing paper may be used in the exposed state for a variety of purposes. However, it is a prevalent practice to stack a cover film for thermal transfer image on the thermal transfer image for protecting it. The cover film for thermal transfer image can be exemplified by a polyester film having an adhesive layer formed thereon or a polyvinyl chloride film which can be stacked by thermo-compression bonding of itself.

In some cases, a water-color ink image, such as an overlapping seal or various stamped images, may be formed by using a water-color ink on the thermal transfer image formed on the printing paper.

However, since the dye receptor layer of the printing paper in which the thermal transfer image is formed is made of a lipophilic or water repellent material, such as polyester, the dye receptor layer does not absorb or is not penetrated by the water-color ink. Therefore, the dye receptor layer does not fix the water-color ink image therein.

Also, since the conventional thermal transfer image cover film is made of a lipophilic material as described above, the cover film does not absorb or is not penetrated by the water-color ink, and therefore does not fix the water-color ink image therein. Thus, the water-color ink image formed on the thermal transfer image is easily destroyed by any contact with water dropping due to rain or perspiration or by rubbing by hand.

Although it is conceivable to form a cover film for thermal transfer image only of a water soluble material to solve the above-described problems, stacking such a cover film directly on the lipophilic receptor layer is extremely difficult and lacks water resistance.

DISCLOSURE OF THE INVENTION

It is an object of the present invention to provide a composition for fixing water-color ink which is capable of providing fixation for a thermal transfer image, particularly a sublimation heat transfer image, to a water stamp, and which has satisfactory adhesion to a dye receptor layer and water resistance. It is another object of the present invention to provide a cover film for thermal transfer image and a thermal transfer image recorded medium which have satisfactory fixation to the water stamp and high indelibility.

The present inventors have found that adding an ion exchanger, such as a clay based interlayer compound or an ion-exchange resin, to a fixing layer provides therefor satisfactory fixation to the water-color ink, without causing any problem in water resistance. The present inventors have thus completed the present invention.

A composition for fixing water-color ink according to the present invention contains an ion exchanger.

The ion exchanger used in the composition for fixing water-color ink of the present invention absorbs moisture of the water-color ink so as to be swollen, and has a function to retain an ionic dye contained in the water-color ink through ion-exchange. Consequently, the presence of the ion exchanger improves the fixation of the water-color ink image. In this case, it is preferable to mixedly use a cation exchanger and an anion exchanger to deal with either a cationic dye or an anionic dye.

As an example of the ion exchanger, a clay based interlayer compound having ion-exchangeability is preferred. For instance, the anion-exchange clay based interlayer compound is exemplified by hydrotalcite. The cation-exchange clay based compound is exemplified by a montmorillonite group mineral as expressed by the following formula (1).

$$(X, Y)_{2\text{-}3}Z_4O_{10}(OH)_2.mH_2O.(W_{1\text{-}3}) \qquad (1)$$

(In the above formula, X represents Al, Fe(III), Mn(III) or Co(III). Y represents Mg, Fe(II), Mn(II), Ni, Zn or Li. Z represents Si or Al. W represents K, Na or Ca. $H_2O$ denotes interlayer water, and m represents an integer.)

The montmorillonite group mineral expressed by the formula (1) is exemplified by natural products or synthetic products of montmorillonite, magnesian montmorillonite, iron montmorillonite, iron magnesian montmorillonite, beidellite, aluminian beidellite, nontronite, aluminian nontronite, saponite, aluminian saponite, hectorire and sauconite, depending upon the combination of X and Y and differences in the number of substitutions. Also, a montmorillonite group mineral having the OH group in the formula (1) substituted by a halogen atom, such as fluorine, can be used.

The cation-exchange clay based interlayer compound can also be exemplified by mica group minerals, such as, sodium silicic mica, sodium taeniolite and lithium taeniolite, other than the montmorillonite group minerals as shown by the formula (1).

The ion-exchange resin can also be used as the ion exchanger. Any of known ion-exchange resins can be used, such as synthetic ion-exchange resin and semi-synthetic ion-exchange resin.

Specifically, the synthetic ion-exchanger is exemplified by:polyacrylate, such as, Aquakeep (trade name) produced by Seitetsu Kagaku Kogyo, Sumiksgel (trade name) produced by Sumitomo Kagaku Kogyo, Wondergel (trade name) produced by Kao, D.W.A.L. (trade name) produced by Dow Chemical, Favor (trade name) produced by Stockhausen, Arasoap (trade name) produced by Arakawa Rinsan Kagaku Kogyo, and Aqualic (trade name) produced by Nippon Shokubai Kagaku Kogyo; saponified products of vinyl acetate-acrylic ester copolymer, such as, Sumikagel and Igetagel (trade name) produced by Sumitomo Kagaku Kogyo; saponified products of vinyl acetate-maleic acid copolymer, such as GP (trade name) produced by Nippon Gosei Kagaku Kogyo; crosslinking products of isobutylene-maleic arthydride copolymer, such as, KIgel (trade name) produced by Kurare Isoprene Chemical; and polyacrylonitrile based saponified products, such as Rasocil (trade name) produced by Japan Esclan and Sumikagel (trade name) produced by Sumitomo Kagaku Kogyo.

The semi-synthetic ion-exchanger is exemplified by:saponified products of starch-acrylonitrile graft polymer, such as Water-Lock (trade name) produced by GPC, Terra-sorb (trade name) produced by Super Absorbent, SGP (trade name) produced by Henkel Japan, and WAS (trade name) produced by Nichiden Kagaku; starch-acrylic acid graft polymer, such as Sanwet (trade name) produced by Sanyo Kasei Kogyo and Lion Polymer (trade name) produced by Lion; and CMC crosslinking products, such as, Aqualon (trade name) produced by Hercules and Akucell (trade name) produced by Enka.

For obtaining satisfactory water-color ink absorption and fixation of water-color ink image, it is preferable to mix such ion-exchangers at a rate of not less than 10% by weight, more preferably 20 to 80% by weight, in the composition for fixing water-color ink.

The ion-exchange resin as the ion exchanger may singly constitute the composition for fixing water-color ink. However, if the clay based interlayer compound or the ion-exchange resin particle is used as the ion exchanger, a binder is required to provide film forming property.

In this case, a water absorptive resin can be used as the binder. The water absorptive resin absorbs and retains the water-color ink. Such a water absorptive resin preferably has a percentage of water absorption of not less than 5%, more preferably not less than 10%, at 20° C., 65%RH. The water absorptive resin is exemplified by a cellulose based polymer, such as an anionic cellulose derivative, or a polyvinylpyrrolidone based polymer, such as polyvinylpyrrolidone and polyvinylpyrrolidone-vinyl acetate copolymer. Above all, the polyvinylpyrrolidone based polymer is preferred.

For obtaining satisfactory water-color ink absorption and fixation of water-color ink image, it is preferable to mix the water absorptive resin at a rate of not less than 20% by weight, more preferably 30 to 70% by weight, in the composition for fixing water-color ink.

It is preferable to use the above water absorptive resin as the binder in combination with a water insoluble resin to improve the water resistance. Polyvinyl chloride can be used as the water insoluble resin. However, a water insoluble resin compatible with the water absorptive resin is preferred, for example, cellulose acetate groups, such as cellulose acetate burylate (CAB), or acetalized products of vinyl alcohol, such as polyvinyl butyral.

As the mixing amount of the above-mentioned water insoluble resin increases, the absorption of the water-color ink fixing layer formed of the composition for fixing water-color ink is lowered. Therefore, it is preferable to mix the water insoluble resin at a rate of not greater than 70% by weight in the composition for fixing water-color ink. Particularly, it is preferable to mix the water insoluble resin at a rate of not greater than 30% by weight, in order to prevent the lowering of the ink absorption speed.

Also, a heat-melting resin may be used as the binder if the water resistance and the adhesion to the thermal transfer image are particularly important.

Any resin having heat melting property can be used. The heat-melting resin is exemplified by polyvinyl chloride, vinyl chloride-vinyl acetate copolymer, vinyl chloride-vinylidene chloride copolymer, vinyl chloride-vinyl acetate-vinyl alcohol copolymer, vinyl chloride-acrylonitrile copolymer, polyurethane resin, butadiene-acrylonitrile copolymer, polyamide resin, polyvinyl butyral, styrene-butadiene copolymer, polyester resin, and acrylic resin.

A crosslinking agent to form a three-dimensional bridge structure may be contained in the composition for fixing water-color ink, in order to retain the water resistance even in the case where the mixing amount of the water absorptive resin and the ion exchanger is increased for improving the fixation of water-color ink image. Such a three-dimensional bridge structure is capable of retaining the water absorptive resin and the ion exchanger therein and hence raising the water resistance of the composition for fixing water-color ink even though the mixing amount of the water absorptive resin and the ion exchanger is increased. The crosslinking agent can be suitably selected from those capable of forming the three-dimensional bridge structure.

As the mixing amount of the crosslinking agent increases, the absorption of the water-color ink of the composition for fixing water-color ink is lowered. Therefore, it is preferable to mix the crosslinking agent at a rate of not greater than 70% by weight in the composition for fixing water-color ink.

It is also preferred that the composition for fixing water-color ink contains a nonionic surface active agent, in order to raise the absorption speed of the water-color ink to facilitate drying of the water-color ink. The nonionic surface active agent is not particularly specified, and can be suitably selected.

However, if the nonionic surface active agent is used in an excessive amount, blooming is likely to occur. Therefore, it is preferable to mix the nonionic surface active agent at a rate of not greater than 50% by weight in the composition for fixing water-color ink.

It is also possible to add a known ultraviolet ray absorbent, antioxidant or diluent, if necessary, to the composition for fixing water-color ink. However, since the water-color ink fixing layer formed of the composition for fixing water-color ink of the present invention is to cover the thermal transfer image, the water-color ink fixing layer is caused to be light-transmitting.

The composition for fixing water-color ink of the present invention can be produced by a known technique. For instance, the composition for fixing water-color ink can be produced by uniformly mixing the water absorptive resin or the heat-melting resin as the binder with the ion exchanger, along with other necessary components, in a methylethylketone solution using a sand mill.

The composition for fixing water-color ink may be applied directly onto the thermal transfer image to form a water-color ink fixing layer thereon. However, it is more convenient to use the composition for fixing water-color ink in the form of cover film to be laminated on the thermal transfer image.

Thus, a cover film for thermal transfer image of the present invention using the composition for fixing water-color ink will now be described.

The cover film for thermal transfer image has a water-color ink fixing layer which contains an ion exchanger and which is peelably formed on a base material. Also, the water-color ink fixing layer has an adhesive layer or a heat-melting resin layer formed thereon. The cover film for thermal transfer image may also have a water-color ink fixing layer containing an ion exchanger formed on one side of a support film, and an adhesive layer or a heat-melting resin layer formed on the other side.

FIG. 1 shows an example of the cover film for thermal transfer image of the present invention. The cover film for thermal transfer image shown in FIG. 1 has an extremely simple structure having a base material 1 and a water-color ink fixing layer 2 formed of the composition for fixing water-color ink on the base material 1. The base material 1 and the water-color ink fixing layer 2 are peelably stacked.

To apply the cover film for thermal transfer image to the thermal transfer image, the water-color ink fixing layer 2 is first superposed and thermo-compression bonded onto the thermal transfer image, and then the base material 1 is peeled off the water-color ink fixing layer 2. Thus, the water-color ink fixing layer 2 is formed on the thermal transfer image to fix the water-color ink image.

As the base material 1, a polyester film or a polyimide film having heat resistance can be used. The surface of the base material 1 on the side of the water-color ink fixing layer 2 may be treated with known mold release processing, if necessary.

The water-color ink fixing layer 2 absorbs the water-color ink and fixes an ionic dye or a pigment contained therein to form the water-color ink image. The water-color ink fixing layer 2 is formed of the composition for fixing water-color ink of the present invention. The thickness of the water-color ink fixing layer 2 is selectively determined in accordance with the requirements.

FIG. 2 shows another state of the cover film for thermal transfer image of the present invention. This cover film for the thermal transfer image has a water-color ink fixing layer 2 with an adhesive layer 3 formed thereon, and is effective in the case where the water-color ink fixing layer 2 is not sufficiently adhered to the thermal transfer image by heat and pressures.

An adhesive for forming the adhesive layer 3 can be selected from known adhesives exhibiting adhesion in thermo-compression bonding. The thickness of the adhesive layer 3 can also be selected suitably. Instead of the adhesive layer, a heat-melting resin layer made of resin having heat-melting property can be formed.

FIG. 3 shows still another state of the cover film for thermal transfer image of the present invention. This cover film for thermal transfer image has a water-color ink fixing layer 2 formed on one side of a transparent support film 5 and an adhesive layer 3 formed on the other side of the support film 5. In this example, the water-color ink fixing layer 2 is bonded to the support film 5 via an adhesive layer 6.

In the cover film for thermal transfer image having such a structure, the support film 5 also serves as the cover film, protecting the thermal transfer image more securely.

With any of the above cover films for thermal transfer image, it is preferable to bond the protective film on the surface of the adhesive layer 3 in advance, and to peel the protective film off when the cover film is used. A polyester film, a polyethylene film or a polypropylene film can be used as the protective film. The protective film may be treated with mold release with a silicon resin.

The cover film for thermal transfer image of the present invention can be produced by a conventional technique. For instance, the cover film for thermal transfer image can be produced by applying and drying the composition for fixing water-color ink diluted with a solvent, on the base material. The adhesive layer or the heat-melting resin layer can be formed by a conventional technique, if necessary.

The water-color ink fixing layer (cover film for thermal transfer image) can be combined with an image forming material (so-called ink ribbon). FIG. 4 is a cross-sectional view showing a thermal transfer image forming material for color image formation employing the cover film for thermal transfer image of the present invention. The thermal transfer image forming material has a base material 1, and a water-color ink fixing layer 2, a yellow ink layer *4a*, a magenta ink layer *4b* and a cyan ink layer *4c* formed on the base material 1. The water-color ink fixing layer 2 and the ink layers *4a* to *4c* are not stacked on one another but are independently formed on the base material 1.

To use the thermal transfer image forming material of FIG. 4, the water-color ink fixing layer 2 is stacked on the color image by first superposing the ink layers *4a* to *4c* sequentially on the dye receptor layer of the printing paper, then forming the color image through thermal transfer in accordance with picture information, and finally superposing and thermo-compression bonding the water-color ink fixing layer 2 onto the color image. Consequently, by forming the thermal transfer image forming material as shown in FIG. 4, the image formation and the stacking of the water-color ink fixing layer 2 on the image can be carried out efficiently.

The thermal transfer image forming material of FIG. 4 may have components similar to conventional ones, except for using the water-color ink fixing layer 2 formed of the composition for fixing water-color ink of the present invention.

The thermal transfer image forming material of FIG. 4 can be produced by a conventional technique. For instance, the thermal transfer image forming material can be produced by applying and drying the composition for fixing water-color ink diluted with a solvent on the base material, and then sequentially applying and drying compositions for forming the ink layers.

In the composition for fixing the water-color ink of the present invention, the ion exchanger retains the ionic dye contained in the water-color ink through ion exchange. In addition, if the water absorptive resin is used as the binder, the water-color ink is quickly absorbed and fixed. If the heat-melting resin is used as the binder, the water resistance and the adhesion to the thermal transfer ink can be assured more significantly.

Consequently, by using the composition for water-color ink formed of the above composition as the cover film for thermal transfer image, and transferring and stacking the water-color ink fixing layer onto the thermal transfer image, it is possible to provide the adhesion to the water-color ink image, to securely fix an overlapping seal or various stamped images, and to provide indelibility.

BEST MODE FOR CARRYING OUT THE INVENTION

Figure 1:
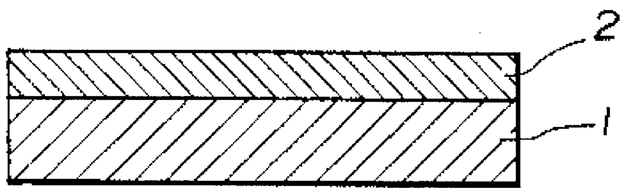
FIG. 1 is a cross-sectional view showing essential portions of an example of a cover film for thermal transfer image according to the present invention.
Figure 2:
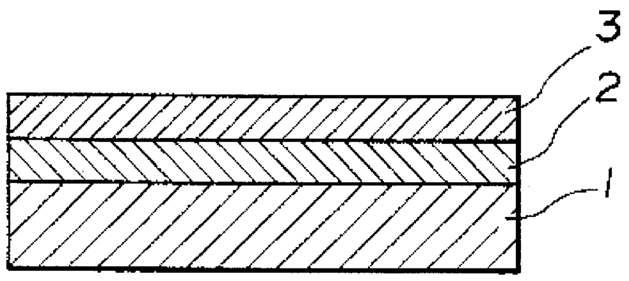
FIG. 2 is a cross-sectional view showing essential portions of another example of the cover film for thermal transfer image according to the present invention.

Preferred embodiments of the present invention will now be described in detail with reference to results of specific experiments.

EXAMPLE 1

10 g of polyvinylpyrrolidone-vinyl acetate copolymer, Rubiscol VA64 (trade name) produced by BASF, was dissolved as a water absorptive resin in 80 g of methylethylketone. Then, 10 g of synthetic smectite, SWN (trade name) produced by Corp Chemical, as an ion exchanger was added to the above mixture. The resulting mixture was treated with dispersion processing for two hours using a sand mill, KM-200 (trade name) produced by Kaneda Rika Kogyo, to form a uniform, milky white disperse solution.

A solution containing 3 g of CAB, 553–0.4 (trade name) produced by Eastman Kodak, as a water insoluble resin dissolved in 7 g of methylethylketone-toluene mixed solvent, was added to the disperse solution. The resulting mixture was uniformly agitated to form a disperse solution of the composition for fixing water-color ink.

The resulting disperse solution of the composition for fixing water-color ink was applied and dried with a dry thickness of 15 μm on a polyester film 125 μm in thickness, using a doctor blade, to form a translucent water-color ink fixing layer.

Then, a solution containing 20 g of vinyl chloride-vinyl acetate copolymer, Denkavinyl #1000D (trade name) produced by Denki Kagaku Kogyo, dissolved in 80 g of methylethylketone was applied and dried with a dry thickness of approximately 30 μm on the water-color ink fixing layer, to form an adhesive layer having satisfactory transparency. The cover film for thermal transfer image was thus formed.

The resulting adhesive layer of the cover film for thermal transfer image was superposed on the thermal transfer image outputted on the printing paper, UPC 3010P (trade name) produced by Sony Corporation. The adhesive layer was thermo-compression bonded using a heat-compression laminating device, produced by Intercosmo, having a roller temperature of 140° C. and a roller passing speed of 500 mm/minute. After the adhesive layer was then left until its temperature was lowered to room temperatures, the polyester film was peeled off. Thus, a transparent and polished water-color ink fixing layer was transferred onto the entire surface of the thermal transfer image, without causing indistinctness of the thermal transfer image.

Then, a stamped image was formed on the water-color ink fixing layer formed on the thermal transfer image, using a water-color black ink for stamp, produced by Gutenberg. The ink absorption and ink fixation of the water-color ink fixing layer were tested and evaluated.

Ink Absorption

The stamped image was formed on the water-color ink fixing layer. After five minutes, the image was wiped, for removing the water-color ink which had not been absorbed. By measuring the density of a solid image remaining on the water-color ink fixing layer using a measuring device, TR-924 (trade name) produced by Macbeth, the water-color ink absorption was determined. A reflection density of not smaller than 1.5 was employed as a practical reference value.

Ink Fixation

The solid image of water stamp was dried, and the reflection density was measured. After the measurement, the entire image was soaked in water for one minute and was subsequently dried. Then, the reflection density was measured again. The density remaining rate before and after the soaking test, that is, (density after test)/(density before test)×100 (%), was expressed as the ink fixation.

The result is shown in Table 1.

TABLE 1

| | Ink Absorption (O.D.) | Ink Fixation (%) |
|---|---|---|
| Example 1 | 2.1 | 91 |
| Example 2 | 2.3 | 93 |
| Example 3 | 1.7 | 90 |
| Example 4 | 2.0 | 89 |
| Example 5 | 1.8 | 92 |
| Example 6 | 2.1 | 90 |
| Example 7 | 2.3 | 92 |
| Comparative Example 1 | 2.1 | 12 |

As is apparent from Table 1, the water-color ink fixing layer in this example exhibited satisfactory water-color ink absorption and ink fixation.

EXAMPLE 2

12 g of polyvinylpyrrolidone-vinyl acetate copolymer, Rubiscol VA64 (trade name) produced by BASF, was dissolved as a water absorptive resin in 80 g of ethanol. Then, 8 g of synthetic hectorite, RDS (trade name) produced by Nippon Silica, as an ion exchanger was added to the above mixture. The resulting mixture was processed by dispersion for two hours using a sand mill, KM-200 (trade name) produced by Kaneda Rika Kogyo, to form a uniform, milky white disperse solution.

A solution containing 4 g of polyvinyl butyral, S-LEC BL-3 (trade name) produced by Sekisui Kagaku, as a water insoluble resin dissolved in 10 g of ethanol, was added to the disperse solution. Then, 1.2 g of nonionic surface active agent, NP-20 (trade name) produced by Nikko Chemical, was added to the resulting mixture. The resulting mixture was uniformly agitated to form a disperse solution of the composition for fixing water-color ink.

The resulting disperse solution of the composition for fixing water-color ink was applied and dried with a dry thickness of 15 μm on a polyester film 125 μm in thickness, using a doctor blade, to form a translucent water-color ink fixing layer.

Then, a solution containing 20 g of vinyl chloride-vinyl acetate copolymer, Denkavinyl #1000D (trade name) produced by Denki Kagaku Kogyo, dissolved in 80 g of methylethylketone was applied and dried with a dry thickness of approximately 30 μm on the water-color ink fixing layer, to form an adhesive layer having satisfactory transparency. The cover film for thermal transfer image was thus produced.

The water-color ink fixing layer was formed on the thermal transfer image in a manner similar to Example 1, using the resulting cover film for thermal transfer image. The transparent, polished water-color ink fixing layer was transferred onto the entire surface of the thermal transfer image, without causing indistinctness of the thermal transfer image.

Also, the water-color ink image was formed on the water-color ink fixing layer, and the ink absorption and the ink fixation of the water-color ink fixing layer were tested and evaluated, as in Example 1. The result is shown in Table 1.

As is apparent from Table 1, the water-color ink fixing layer of this example exhibited satisfactory water-color ink absorption and fixation.

EXAMPLE 3

As the water absorptive resin, 16 g of polyvinylpyrrolidone-vinyl acetate copolymer, Rubiscol VA73E (trade name) produced by BASF, 4 g of soluble nylon, AQ Nylon P-70 (trade name) produced by Toray, 12 g of montmorillonite, Kunipia (trade name) produced by Kunimine Kogyo, and 100 g of isopropyl alcohol were treated with dispersion using a sand mill, KM-200 (trade name) produced by Kaneda Rika Kogyo. 6 g of block type polyisocyanate crosslinking agent, Coronate 2513 (trade name) produced by Nippon Polyurethane was added to the resulting mixture and agitated to form a disperse solution of the composition for fixing water-color ink.

The resulting disperse solution of the composition for fixing water-color ink was applied with a dry thickness of 15 μm on a polyester film 125 μm in thickness, using a doctor blade, and was heat-dried by hot air at 135° C. for 15 minutes, to form a translucent water-color ink fixing layer.

Then, a solution containing 20 g of vinyl chloride-vinyl acetate copolymer, Denkavinyl #1000D (trade name) produced by Denki Kagaku Kogyo, dissolved in 80 g of methylethylketone was applied and dried with a dry thickness of approximately 30 μm on the water-color ink fixing layer, to form an adhesive layer having satisfactory transparency. The cover film for thermal transfer image was thus produced.

The water-color ink fixing layer was formed on the thermal transfer image in a manner similar to Example 1, using the resulting cover film for thermal transfer image. The transparent, polished water-color ink fixing layer was transferred onto the entire surface of the thermal transfer image, without causing indistinctness of the thermal transfer image.

Also, the water-color ink image was formed on the water-color ink fixing layer, and the ink absorption and the ink fixation of the water-color ink fixing layer were tested and evaluated, as in Example 1. The result is shown in Table 1.

As is apparent from Table 1, the water-color ink fixing layer of this example exhibited satisfactory water-color ink absorption and fixation.

EXAMPLE 4

5 g of hydroxypropyl cellulose, HPC-M (trade name) produced by Nippon Soda, as the water absorptive resin was dissolved in 80 g of isopropyl alcohol. Then, 15 g of synthetic smectite, SWN (trade name) produced by Corp Chemical, as the ion exchanger was added to the resulting thereto. The resulting mixture was treated with dispersion for two hours using a sand mill, KM-200 (trade name) produced by Kaneda Rika Kogyo, to form a uniform, milky white disperse solution of the composition for fixing water-color ink.

The resulting disperse solution of the composition for fixing water-color ink was applied and dried with a dry thickness of 15 μm on a polyester film 125 μm in thickness, using a doctor blade, to form a translucent water-color ink fixing layer.

Then, a solution containing 20 g of vinyl chloride-vinyl acetate copolymer, Denkavinyl #1000D (trade name) produced by Denki Kagaku Kogyo, dissolved in 80 g of methylethylketone was applied and dried with a dry thickness of approximately 30 μm on the water-color ink fixing layer, to form an adhesive layer having satisfactory transparency. The cover film for thermal transfer image was thus produced.

The water-color ink fixing layer was formed on the thermal transfer image in a manner similar to Example 1, using the resulting cover film for thermal transfer image. The transparent, polished water-color ink fixing layer was transferred onto the entire surface of the thermal transfer image, without causing indistinctness of the thermal transfer image.

Also, the water-color ink image was formed on the water-color ink fixing layer, and the ink absorption and the ink fixation of the water-color ink fixing layer were tested and evaluated, as in Example 1. The result is shown in Table 1.

As is apparent from Table 1, the water-color ink fixing layer of this example exhibited satisfactory water-color ink absorption and fixation.

EXAMPLE 5

10 g of hydroxypropyl cellulose, HPC-L (trade name) produced by Nippon Soda and 10 g of synthetic smectite, Smecton SA (trade name) produced by Kunimine Kogyo, as the water absorptive resin were dissolved in 80 g of isopropyl alcohol. The resulting mixture was treated with dispersion for two hours using a sand mill, KM-200 (trade name) produced by Kaneda Rika Kogyo, to form a uniform, milky white disperse solution. Then, 100 g of reactive urethane resin, Elastron C-52 (trade name) produced by Daiichi Kogyo Seiyaku, as the crosslinking agent was added to and uniformly dispersed in the disperse solution, to form a disperse solution of the composition for fixing water-color ink.

The resulting disperse solution of the composition for fixing water-color ink was applied with a dry thickness of 15 μm on a polyester film 125 μm in thickness, using a doctor blade, and was heat-dried by hot air at 135° C. for four minutes, to form a translucent water-color ink fixing layer.

Then, a solution containing 20 g of vinyl chloride-vinyl acetate copolymer, Denkavinyl #1000D (trade name) produced by Denki Kagaku Kogyo, dissolved in 80 g of methylethylketone was applied and dried with a dry thickness of approximately 30 μm on the water-color ink fixing layer, to form an adhesive layer having satisfactory transparency. The cover film for thermal transfer image was thus produced.

The water-color ink fixing layer was formed on the thermal transfer image in a manner similar to Example 1, using the resulting cover film for thermal transfer image. The transparent, polished water-color ink fixing layer was transferred onto the entire surface of the thermal transfer image, without causing indistinctness of the thermal transfer image.

Also, the water-color ink image was formed on the water-color ink fixing layer, and the ink absorption and the ink fixation of the water-color ink fixing layer were tested and evaluated, as in Example 1. The result is shown in Table 1.

As is apparent from Table 1, the water-color ink fixing layer of this example exhibited satisfactory water-color ink absorption and fixation.

EXAMPLE 6

100 g of synthetic hectorite, XLS (trade name) produced by Nippon Silica, 100 g of hydrotalcite, DHT-4C (trade name) produced by Kyowa Kagaku, and 400 g of polyvinylpyrrolidone-vinyl acetate copolymer, Rubiscol VA64 (trade name) produced by BASF were introduced into 2 kg of methylethylketone solution containing 20% by weight of CAB. The resulting mixture was processed by dispersion for one week using a roll mill, to form a disperse solution of the composition for fixing water-color ink.

Figure 4:
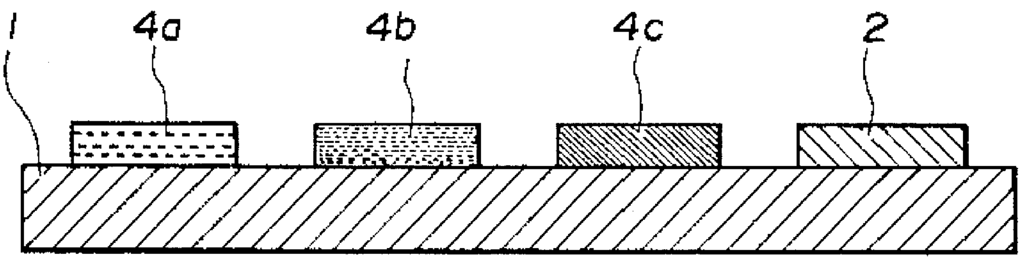
FIG. 4 is a cross-sectional view showing essential portions of a thermal transfer image forming material according to the present invention.

A color ink ribbon having a transparent water-color ink fixing layer approximately 3 μm in thickness, as shown in FIG. 4. was produced using the disperse solution. The same base material and ink layers of yellow, cyan and magenta as those of the color ink ribbon, VPM-30STA (trade name) produced by Sony Corporation, were used.

This ink ribbon was set in a video printer, CVP-G7 (trade name) produced by Sony Corporation, and gradation printing was carried out on a printing paper, VPM-30STA (trade name) produced by Sony Corporation. Finally, the water-color ink fixing layer was transferred by solid printing. Thus, a thermal transfer image covered with the glossy water-color ink fixing layer was produced.

Also, the water-color ink image was formed on the water-color ink fixing layer, and the ink absorption and the ink fixation of the water-color ink fixing layer were tested and evaluated, as in Example 1. The result is shown in Table 1.

As is apparent from Table 1, the water-color ink fixing layer of this example exhibited satisfactory water-color ink absorption and fixation.

EXAMPLE 7

100 g of synthetic hectorite, XLS (trade name) produced by Nippon Silica, 100 g of ion exchanger, IXE-700 (trade name) produced by Toa Gosei Kagaku, and 400 g of polyvinylpyrrolidone-vinyl acetate copolymer, Rubiscol VA64 (trade name) produced by BASF were introduced into 2 kg of methylethylketone-toluene mixed solution containing 20% by weight of polyvinyl butyral, S-LEC BLS (trade name) produced by Sekisui Kagaku. The resulting mixture was treated with dispersion for one week using a roll mill, and 50 g of nonionic surface active agent, PEG 400 (trade name) produced by Daiichi Kogyo Seiyaku, was added thereto and agitated, to form a disperse solution of the composition for fixing water-color ink.

A color ink ribbon was produced in a manner similar to Example 6, using the disperse solution. However, an adhesive layer approximately 3 μm in dry thickness formed of CAB was stacked on the water-color ink fixing layer. Then, a thermal transfer image was formed using the ink ribbon, and the water-color ink fixing layer was formed thereon, as in Example 6. Thus, a thermal transfer image covered with the glossy water-color ink fixing layer was produced.

Also, the water-color ink image was formed on the water-color ink fixing layer, and the ink absorption and the ink fixation of the water-color ink fixing layer were tested and evaluated, as in Example 1. The result is shown in Table 1.

As is apparent from Table 1, the water-color ink fixing layer of this example exhibited satisfactory water-color ink absorption and fixation.

COMPARATIVE EXAMPLE 1

A comparative composition for fixing water-color ink was prepared by repeating processes similar to those of Example 1, except for not using an interlayer compound. By using this comparative composition for fixing water-color ink, a comparative cover film for thermal transfer image was produced.

A water-color ink fixing layer was formed on the thermal transfer image in a manner similar to Example 1, using the resulting cover film for thermal transfer image. Thus, the transparent, polished water-color ink fixing layer was transferred on the entire surface of the thermal transfer image, without causing indistinctness of the thermal transfer image. However, as a water-color ink image was formed on the water-color ink fixing layer to test and evaluate the ink absorption and ink fixation of the water-color ink fixing layer, the comparative water-color ink fixing layer exhibited a water-color ink fixation much lower than that of the water-color ink fixing layers of the examples.

EXAMPLE 8

1 g of cation-exchange resin, such as, starch-acrylic acid graft polymer, Sanwet (trade name) produced by Sanyo Kasei, was gradually added to 1 liter of distilled water while its was intensively agitated. The resulting mixture was treated with ball mill dispersion for two days, to form a transparent, viscous swelling solution. This swelling solution was applied with a wet thickness of 100 μm onto a polyester film 150 μm in thickness with a doctor blade. The swelling solution was then dried by hot air at 120° C., to produce a transparent layer having slight irregularities on the surface thereof.

Then, 5 g of vinyl chloride-vinyl acetate copolymer, VYGF (trade name) produced by Union Carbide, was dissolved in 45 g of methylethylketone. The resulting product was applied with a wet thickness of 50 μm onto the cation-exchange resin layer with a doctor blade, and was dried to form a highly transparent coat.

The vinyl chloride-vinyl acetate copolymer coat was fed between rollers heated at 120° C. at rate of 1 cm/second, so as to be superposed on and thermo-compression bonded to the sublimation heat transfer image outputted on a printing paper, UPC 3010P (trade name) produced by Sony Corporation. The vinyl chloride-vinyl acetate copolymer coat on the sublimation heat transfer image was cooled down to room temperatures, and the polyester film on the uppermost layer was peeled. Thus, a slightly opaque, polished layer was formed on the entire surface of the printing receptor layer.

An image was stamped on this layer with a commercial water-color black ink (a stamp ink produced by Gutenberg), and was left for a few minutes. The image did not bleed even though it was touched by fingers. The image was not transferred to other paper or an adhesive film, either.

As a similar stamping operation was carried out on a normal sublimation heat transfer image which had not been treated with the above processing, the stamped image was easily moved by a touch of fingers or superposition of paper. The stamped image was not fixed.

In the present example, the cation-exchange resin layer was formed directly on the polyester film. However, it is a matter of course that the cation-exchange resin layer can also be formed on a polyester film treated with mold release.

The vinyl chloride-vinyl acetate copolymer was used as the adhesion supply resin for the following reason. That is, the printing receptor layer used in the present example consists mainly of resins of the same type, which do not adversely affect age-based stability, such as light discoloration and dark discoloration, of the image after the heat melting. Also, the resulting composite layer has the uppermost hydrophilic layer buried in the lipophilic resin layer. Therefore, even though the stamped image is soaked in water, it does not immediately bleed, exhibiting behavior of silver salt photograph.

If gelatin or polyvinyl alcohol, which is water soluble, is used as the adhesion supply resin, such a high ink fixing effect cannot be expected.

EXAMPLE 9

150 g of montmorillonite, Kunipia F (trade name) produced by Kunimine Kogyo, was introduced into 1 kg of ethanol solution containing 10% by weight of hydroxypropyl cellulose, and was treated with roll mill dispersion for one week, to form a suspension.

The ink applying surface of the plate film of an ink ribbon, produced by Sony Corporation, was coated with Y, M and C. Then, the above suspension was applied thereto and dried in the same size as the picture, and was reeled up. A substantially transparent laminating coat with a dry thickness of 1 μm was produced by using a gravure coater for mass production. A ribbon cassette as a product was produced from the ink ribbon plate having the laminating layer, through slit and small-winding processes.

An auxiliary additive, such as a fluorescent brightener or an ultraviolet ray absorbent, may be added to the laminating layer, as long as it does not disturb the adhesion to the printing receptor layer.

The ribbon cassette was set in a video printer, G500 (trade name) produced by Sony Corporation, to carry out gradational printing on an STA printing paper and subsequently solid printing thereon. Thus, a highly glossy image was outputted with the laminating layer perfectly stacked on the printed image. As a stamp operation was carried out on the image using a commercial water-color red ink, the stamped image was fixed on the original image without bleeding even though it was rubbed with fingers immediately after the stamping.

EXAMPLE 10

A suspension produced as in Example 9, using a synthetic smectite produced by Kunimine Kogyo as the ion exchanger, was applied onto a mold-released surface of a mold-released polyethylene terephthalate film 6 μm in thickness with a wire bar. Then, the suspension was dried by hot air to form a coat 2 μm in thickness.

Then, a adhesive composition dissolved in an ethanol/toluene (1/1 by weight) mixed solvent was applied and dried with a wet thickness of 20 μm onto the coat with a doctor blade, to form a transparent two-layer laminating layer.

The adhesive composition was produced by uniformly mixing the following components with a ball mill.

| Adhesive Composition: | |
|---|---|
| nylon, 1276 TE (trade name) produced by Japan Rilsan | 5 parts by weight |
| organic boron compound polymer, Hi-Boron DLG-1100K (trade name) produced by Boron International | 1 part by weight |
| ethanol | 50 parts by weight |
| toluene | 50 parts by weight |

The resulting adhesive composition was left at 30° C. for 10 days. However, the adhesive composition did not change and was stored stably.

Figure 3:
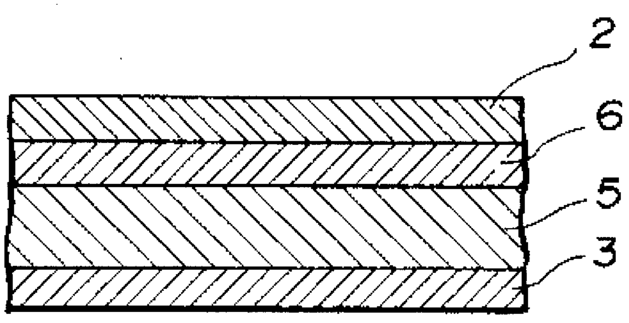
FIG. 3 is a cross-sectional view showing essential portions of still another example of the cover film for thermal transfer image according to the present invention.

A film formed of a polyethylene terephthalate film 25 μm in thickness having its one side coated only with the above-described adhesive composition with the previous method was prepared separately from the two-layer laminating layer. On the non-adhesive layer side of the film not coated with the adhesive, the previous laminating layer with its adhesive layer side facing the non-adhesive layer side was fed between metallic rollers heated at 120° C. at a rate of 3 cm/second so as to be thermo-compression bonded. The laminating layer was then cooled down to room temperatures, and the mold-released polyethylene terephthalate film on the uppermost layer was peeled off. Thus, a hyaline laminating film of composite layers, as shown in FIG. 3, was produced.

Then, the adhesive layer of the laminating film of composite layer structure, facing the sublimation heat transfer image shown in Example 8, was passed once between commercial laminating heat rollers, MS Pouch L-100 mini (trade name) produced by Meiko Shokai. Even this operation did not cause the image to be indistinct. In addition, the sublimation heat transfer printing paper and the laminating film of the present example were perfectly bonded into one unit through the adhesive layer.

When the laminated film was forcibly peeled from both sides thereof using a commercial adhesive tape, the boundary between the printing receptor layer and the adhesive layer remained unchanged while peeling occurred within the printing paper. This fact indicates that it is impossible to carry out any addition or modification on the original image after the laminating. When a stamp operation was carried out on the uppermost layer (receptor layer) of the resulting film with the method shown in Example 8, the ink was fixed within one minute.

A comparative example will now be described, in order to observe the indelibility effect of the composite-layer laminating film of the present example.

As the same heat laminating processing as the present example was carried out on the sublimation heat transfer image as shown in Example 8, using a commercial laminating film, Pouchikko Film (trade name) produced by Meiko Shokai, an integrated film without causing indistinctness of the image was produced. However, when the film was forcibly peeled from both sides using a commercial adhesive tape, perfect peeling easily occurred on the boundary between the printing receptor layer and the adhesive layer, exposing the original image to outside.

The above fact indicates that it is possible to carry out any addition or modification on the original image after the laminating.

The specific embodiments of the present invention have been described above. However, it is to be understood that the present invention is not limited to the above embodiments, and that various changes and modifications can be effected without departing from the scope of the present invention. For instance, the cover film of the present invention can be used both for a sublimation heat transfer type and a melting heat transfer type. In addition, an oil based ink as well as the water-color ink can be used for stamp.

We claim:

1. A composition for fixing water color ink comprising an inorganic ion exchanger and a binder, said inorganic ion exchanger being a mixture of an anion ion exchanger and a cation ion exchanger.

2. The composition for fixing water-color ink as claimed in claim 1, wherein the binder is a water absorptive resin.

3. A composition for fixing water color ink as defined in claim 2, wherein said water absorptive resin has a percentage of water absorption of not less than 5% at 20° C., 65% RH.

4. The composition for fixing water-color ink as claimed in claim 1, wherein the binder includes the water absorptive resin and a water insoluble resin.

5. The composition for fixing water-color ink as claimed in claim 4, wherein the water absorptive resin is a polyvinylpyrrolidone polymer.

6. The composition for fixing water-color ink as claimed in claim 1, wherein the binder is a heat-melting resin.

7. The composition for fixing water-color ink as claimed in claim 1, further containing a crosslinking agent.

8. The composition for fixing water-color ink as claimed in claim 1, further containing a nonionic surface active agent.

* * * * *